United States Patent
You

(10) Patent No.: US 10,661,792 B2
(45) Date of Patent: *May 26, 2020

(54) SYSTEM AND METHOD FOR PERFORMING AUTONOMOUS EMERGENCY BRAKING

(71) Applicant: MANDO CORPORATION, Pyeongtaek-si, Gyeonggi-do (KR)

(72) Inventor: Kwan Sun You, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,760

(22) Filed: Dec. 11, 2018

(65) Prior Publication Data

US 2019/0126917 A1 May 2, 2019

Related U.S. Application Data

(63) Continuation of application No. 16/172,296, filed on Oct. 26, 2018.

(30) Foreign Application Priority Data

Oct. 27, 2017 (KR) ........................ 10-2017-0141379

(51) Int. Cl.
*B60W 30/09* (2012.01)
*B62D 15/02* (2006.01)
(Continued)

(52) U.S. Cl.
CPC .............. *B60W 30/09* (2013.01); *B60T 7/22* (2013.01); *B60W 30/095* (2013.01);
(Continued)

(58) Field of Classification Search
CPC ..... B62D 15/0265; B62D 1/0257; B60T 7/22; B60T 7/12; B60T 2201/022; B60W 30/09;
(Continued)

(56) References Cited

U.S. PATENT DOCUMENTS 10,053,088 B1 *  8/2018  Askeland ................. H04N 7/18
2008/0021612 A1 * 1/2008  Sakuma ................ B62D 5/008
701/41
(Continued)

FOREIGN PATENT DOCUMENTS

CN      106904157 A    6/2017
EP        3135550 A2    3/2017
(Continued)

OTHER PUBLICATIONS

Office Action issued in corresponding Korean Application No. 10-2017-0141379, dated Jul. 1, 2019.
(Continued)

*Primary Examiner* — Mussa A Shaawat
(74) *Attorney, Agent, or Firm* — Morgan, Lewis & Bockius LLP

(57) ABSTRACT

A system and method for performing autonomous emergency braking (AEB) based on peripheral situations of a vehicle. The AEB system includes a front lateral detection sensor, a vehicle dynamics sensor, and an electronic control unit (ECU). The front lateral detection sensor detects a distance and a relative speed between a host vehicle and a peripheral object, or transmits peripheral images of the host vehicle to the ECU. The vehicle dynamics sensor detects a driving speed of the host vehicle, and transmits the detected driving speed to the ECU. The ECU receives detection signals from the front lateral detection sensor and the vehicle dynamics sensor, and increases a size of an AEB control available region and/or an AEB control available speed when at least one leading moving object or at least one external object is present in longitudinal and latitudinal directions of a forward region of the host vehicle and the host vehicle is unable to perform steering avoidance capable of preventing collision with the leading moving object or the external object. Accordingly, even when several leading
(Continued)

vehicles are present not only in longitudinal but also latitudinal directions of a forward region of the host vehicle and the host vehicle is unable to perform steering avoidance, the possibility of collision between the host vehicle and the leading vehicles can be reduced.

18 Claims, 4 Drawing Sheets

(51) Int. Cl.
| | |
|---|---|
| *B60T 7/22* | (2006.01) |
| *B60W 30/095* | (2012.01) |
| *B60T 7/12* | (2006.01) |
| *B60W 10/18* | (2012.01) |
| *B60W 10/20* | (2006.01) |
| *G05D 1/02* | (2020.01) |

(52) U.S. Cl.
CPC ............ *B62D 15/0265* (2013.01); *B60T 7/12* (2013.01); *B60T 2201/022* (2013.01); *B60W 10/18* (2013.01); *B60W 10/20* (2013.01); *B60W 2420/42* (2013.01); *B60W 2420/52* (2013.01); *G05D 1/0257* (2013.01)

(58) Field of Classification Search
CPC .......... B60W 30/095; B60W 2420/52; B60W 2420/42; B60W 10/20; B60W 10/18
See application file for complete search history.

(56) References Cited

U.S. PATENT DOCUMENTS

| | | | | |
|---|---|---|---|---|
| 2008/0074246 A1* | 3/2008 | Isaji | ........................ | B60T 7/22 |
| | | | | 340/435 |
| 2009/0143986 A1* | 6/2009 | Stein | ........................ | G08G 1/16 |
| | | | | 701/301 |
| 2012/0109460 A1* | 5/2012 | Tokimasa | ............ | B60W 50/045 |
| | | | | 701/41 |
| 2012/0314071 A1* | 12/2012 | Rosenbaum | ...... | B60W 30/0956 |
| | | | | 348/148 |
| 2013/0166150 A1* | 6/2013 | Han | ...................... | B60W 10/18 |
| | | | | 701/42 |
| 2015/0025745 A1* | 1/2015 | Tamura | ................... | B62D 5/046 |
| | | | | 701/41 |
| 2015/0151725 A1* | 6/2015 | Clarke | ................... | B60W 30/00 |
| | | | | 701/28 |
| 2015/0166062 A1* | 6/2015 | Johnson | ................. | B60W 30/12 |
| | | | | 701/41 |
| 2015/0183410 A1* | 7/2015 | Ko | .......................... | B60T 8/174 |
| | | | | 701/96 |
| 2015/0210274 A1* | 7/2015 | Clarke | ................... | B60W 30/00 |
| | | | | 382/104 |
| 2015/0232090 A1 | 8/2015 | Jeon et al. | | |
| 2015/0251664 A1* | 9/2015 | Zagorski | ................ | B62D 6/003 |
| | | | | 701/41 |
| 2015/0336547 A1* | 11/2015 | Dagan | ....................... | B60T 7/22 |
| | | | | 701/70 |
| 2016/0082912 A1* | 3/2016 | Yoon | ....................... | B60R 21/01 |
| | | | | 701/45 |
| 2017/0098131 A1* | 4/2017 | Shashua | ............. | G06K 9/00805 |
| 2017/0210381 A1 | 7/2017 | Nishimura et al. | | |
| 2017/0210383 A1 | 7/2017 | Nishimura | | |
| 2017/0327094 A1* | 11/2017 | Inoue | ........................ | B60T 7/22 |
| 2017/0327110 A1* | 11/2017 | Inoue | ..................... | B60W 10/18 |
| 2018/0154891 A1* | 6/2018 | Schneider | ................. | B60T 8/00 |
| 2018/0162387 A1* | 6/2018 | Sung | ....................... | G08G 1/165 |
| 2018/0257647 A1* | 9/2018 | Jurca | ....................... | G01S 7/415 |
| 2018/0281857 A1* | 10/2018 | Choi | ..................... | B60W 10/18 |
| 2018/0354505 A1* | 12/2018 | Meier | ................... | A01M 29/10 |
| 2018/0373458 A1* | 12/2018 | Kim | ..................... | G06F 3/0647 |
| 2019/0241161 A1* | 8/2019 | Aitidis | ...................... | B60T 7/12 |

FOREIGN PATENT DOCUMENTS

| | | |
|---|---|---|
| JP | H07-257300 A | 10/1995 |
| JP | 2013-126823 A | 6/2013 |
| JP | 2016-124311 A | 7/2016 |
| JP | 2017-117192 A | 6/2017 |
| KR | 101480610 B1 | 1/2015 |
| KR | 10-2017-0040604 A | 4/2017 |

OTHER PUBLICATIONS

Korean Office Action dated Feb. 12, 2019 issued in Korean Patent Application No. 10-2017-0141379.
Extended European Search Report dated Mar. 25, 2019 issued in European Patent Application No. 18202978.5.

* cited by examiner

SYSTEM AND METHOD FOR PERFORMING AUTONOMOUS EMERGENCY BRAKING

CROSS-REFERENCE TO RELATED APPLICATION

This application is a continuation of U.S. application Ser. No. 16/172,296, filed Oct. 26, 2018, which claims priority under 35 U.S.C. § 119 to Korean Patent Application No. 10-2017-0141379, filed on Oct. 27, 2017 in the Korean Intellectual Property Office, the disclosures of which are incorporated herein by reference in their entirety.

BACKGROUND

1. Field

Embodiments of the present disclosure relate to a system and method for performing autonomous emergency braking (AEB) based on peripheral situations of a vehicle, and more particularly to a system and method for performing autonomous emergency braking (AEB), which can adjust the size of an AEB control available region and an AEB control available speed by determining whether steering avoidance of the vehicle can be carried out according to peripheral situations of the vehicle, resulting in increased utility and availability of the vehicle.

2. Description of the Related Art

Generally, when a dangerous obstacle such as a leading moving object (e.g., a movable device such as a vehicle) or an external object (e.g., a moving person such as a pedestrian, or fixed installations such as precast pavers, guardrails, and curbs) is detected in a forward region of a vehicle during vehicle driving, an Autonomous Emergency Braking (AEB) system may warn a driver of a dangerous situation having a high possibility of collision when there is a high possibility of collision with the dangerous obstacle. If necessary, the AEB system performs autonomous emergency braking to prevent the vehicle from colliding with any obstacle. The AEB application fields have recently been increased and standardized, such that many developers and companies are conducting intensive research into the advanced evolved AEB system that is capable of extending utility and effectiveness in a manner that the advanced AEB system can operate in many more scenarios than a conventional AEB system, and guaranteeing higher safety and stability than the conventional AEB system in a manner that the advanced AEB system can prevent the vehicle from colliding with any obstacle.

However, the conventional AEB system has been designed to have a maximum collision avoidable speed of 60 km/h to avoid possible rear-end collisions at higher speeds, on the assumption that only one leading vehicle is present in a longitudinal direction of a forward region of a host vehicle and the host vehicle has an opportunity to perform steering avoidance capable of preventing collision with the leading vehicle. Thus, if it is impossible for the host vehicle to perform steering avoidance as shown in FIG. 4 due to not only a leading vehicle present in a longitudinal direction of a forward region of the host vehicle but also other leading vehicles present in, e.g., a latitudinal direction of the forward region, the host vehicle has difficulty avoiding collision with such leading vehicles.

As a result, there is needed a new technology for allowing the AEB system to overcome legacy disadvantages in terms of utility and availability such that the AEB system can be applied to many more applications, resulting in reduction in traffic accidents.

CITED REFERENCES

Patent Documents

Korean Patent Registration No. 1480610 (2015.01.02)
Japanese Patent Laid-Open Publication No. 2016-0124311 (2016.07.11)
Japanese Patent Laid-Open Publication No. 2017-0117192 (2017.06.29)

SUMMARY

Therefore, it is an aspect of the present disclosure to provide a system and method for performing autonomous emergency braking (AEB) based on peripheral situations of a host vehicle, which can determine whether the host vehicle can perform steering avoidance based on peripheral situations when not only a leading vehicle present in a longitudinal direction of a forward region of the host vehicle but also when other leading vehicles present in a latitudinal direction of the forward region are detected, and can reduce a possibility of collision between the host vehicle and the leading vehicles by increasing the size of an AEB control available region and/or an AEB control available speed when the host vehicle is unable to perform steering avoidance.

Additional aspects of the disclosure will be set forth in part in the description which follows and, in part, will be obvious from the description, or may be learned by practice.

In accordance with an aspect of the present disclosure, a system for performing autonomous emergency braking (AEB) based on peripheral situations of a vehicle is disclosed. The AEB system includes a front lateral detection sensor, a vehicle dynamics sensor, and an electronic control unit (ECU). The front lateral detection sensor detects a distance and a relative speed between a host vehicle and a peripheral object, or transmits peripheral images of the host vehicle to the ECU. The vehicle dynamics sensor detects a driving speed of the host vehicle, and transmits the detected driving speed to the ECU. The ECU receives detection signals from the front lateral detection sensor and the vehicle dynamics sensor, and increases a size of an AEB control available region and/or an AEB control available speed when at least one leading moving object or at least one external object is present in longitudinal and latitudinal directions of a forward region of the host vehicle and the host vehicle is unable to perform steering avoidance capable of preventing collision with the leading moving object or the external object.

The ECU function of recognizing whether there is a possibility of collision between the host vehicle and either the leading moving object or the external object includes selecting the host vehicle, the leading moving object collidable with the host vehicle, or the external object collidable with the host vehicle to be a target vehicle for AEB-control, and if the sensors determine that the leading moving object or the external object is present in front lateral directions of left and right lanes of a current lane of the host vehicle, or determine that a steering avoidance available region is not present in left/right lateral directions of the target vehicle, performing AEB control by increasing the AEB control available speed.

The ECU functionality may include, if the sensors determine that the leading moving object or the external object is not present in the front lateral directions of the left and right lanes of the current lane of the host vehicle, or determine that the steering avoidance available region is present in the left/right lateral directions of the target vehicle, performing AEB control by maintaining the AEB control available speed.

When a driver of the host vehicle has an intention to manipulate the host vehicle, the ECU may again recognize information about whether there is a possibility of collision between the host vehicle and either the leading moving object or the external object.

The information about whether there is a possibility of collision between the host vehicle and either the leading moving object or the external object may be recognized through a time-to-collision (TTC) parameter indicating a total time to be consumed until two objects collide with each other.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Advantages and features of the present disclosure and a method of achieving the advantages and features of the present disclosure will be clearly understood from exemplary embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure. That is, the present disclosure is defined only by the claims. The same reference numbers will be used throughout this specification to refer to the same parts.

A system and method for performing autonomous emergency braking based on peripheral situations of a vehicle according to an embodiment of the present disclosure will hereinafter be described with reference to the attached drawings.

Figure 1:
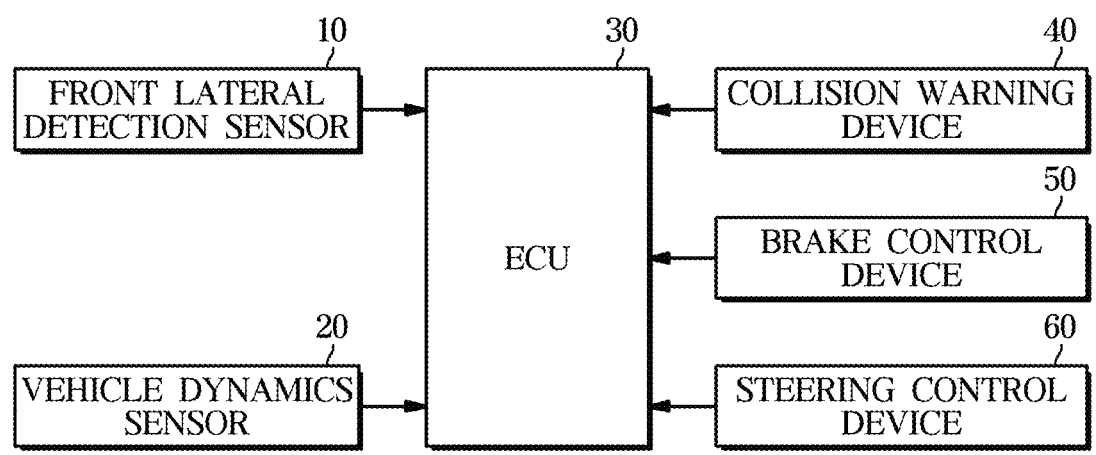
FIG. 1 is a block diagram illustrating an autonomous emergency braking (AEB) system according to an exemplary embodiment of the present disclosure.

FIG. 1 is a block diagram illustrating a system for performing autonomous emergency braking (hereinafter referred to as an AEB system) according to an exemplary embodiment of the present disclosure.

Referring to FIG. 1, the AEB system according to an embodiment of the present disclosure may include a front lateral detection sensor 10, a vehicle dynamics sensor 20, an electronic control unit (ECU) 30, a collision warning device 40, a brake control device 50, and a steering control device 60.

The front lateral detection sensor 10 may be implemented as any one or more of various well-known sensors, such as a radar sensor, etc. At least one front lateral detection sensor 10 may be respectively installed at a center part of a front surface of a host vehicle and/or a corner part of the host vehicle, may emit a light beam within a range of a predetermined angle with respect to a front lateral region of each sensor, may receive the light beam reflected from peripheral objects located in the vicinity of the host vehicle, and may detect an angle, a distance, a relative speed, a relative acceleration, etc., between the host vehicle and each peripheral object, such that the front lateral detection sensor 10 may transmit the recognized vehicle peripheral information to the ECU 30. Alternatively, the front lateral detection sensor 10 may also be implemented as any one or more of various well-known image sensors, for example, an FIR camera, a CMOS camera, a CCD camera, etc. The front lateral detection sensor 10 may be arranged at an upper end of a windshield of a host vehicle, may sense and project various kinds of lights within the range of a predefined angle and a predefined distance with respect to a front lateral region of the host vehicle, and may acquire an image of an external object located ahead of the host vehicle, such that the front lateral detection sensor 10 may sense a position, movement, etc. of the external object through the acquired image, and may transmit the sensed information to the ECU 30.

The vehicle dynamics sensor 20 may be implemented as any one or more of various well-known sensors, such as a wheel sensor, etc. At least one vehicle dynamics sensor 20 may be installed at front, rear, left and right wheels of the host vehicle, such that the vehicle dynamics sensor 20 may sense a driving speed, acceleration, etc., of the host vehicle, and may transmit the sensed information to the ECU 30.

The ECU 30 may receive the signal sensed by the front lateral detection sensor 10 and the signal sensed by the vehicle dynamics sensor 20, and may determine whether the host vehicle can perform steering avoidance based on peripheral situation information (e.g., a situation in which not only a leading vehicle is present in a longitudinal direction of a forward region of the host vehicle but also other leading vehicles are present in a latitudinal direction of the forward region). If it is impossible for the host vehicle to perform steering avoidance, the ECU 30 may increase the size of an AEB control available region and may also increase an AEB control available speed.

The collision warning device 40 may receive a control signal of the ECU 30, and may inform the driver of the host vehicle that there is a high possibility of collision with an obstacle present in a forward region of the host vehicle. The brake control device 50 may receive a control signal from the ECU 30 to generate brake pressure of the host vehicle. The steering control device 60 may receive a control signal from the ECU 30 to generate a steering angle of a steering wheel of the host vehicle.

The present disclosure may provide a method for determining whether the host vehicle can perform steering avoidance based on peripheral situations (e.g., a situation in which not only a leading vehicle is present in a longitudinal direction of a forward region of the host vehicle but also other leading vehicles are present in a latitudinal direction of the forward region), and increasing the size of an AEB control available region and/or the AEB control available speed of the host vehicle when the host vehicle is unable to perform steering avoidance.

A method for performing autonomous emergency braking control (hereinafter referred to as an AEB control method) by predicting a peripheral collision situation using the above-mentioned system according to the embodiment of the present disclosure will hereinafter be described with reference to FIG. 2.

Figure 2:
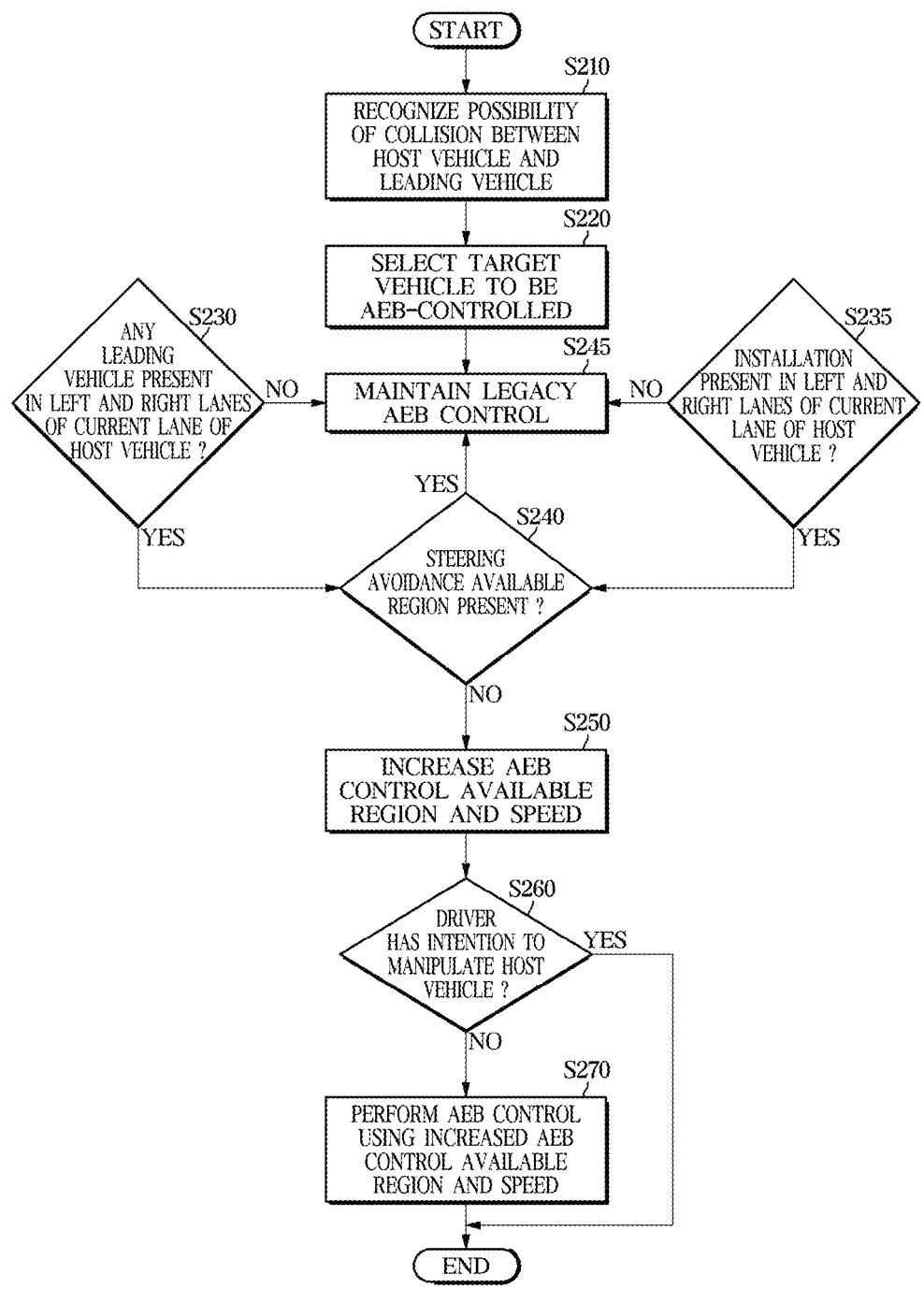
FIG. 2 is a flowchart illustrating an autonomous emergency braking (AEB) method according to an exemplary embodiment of the present disclosure.
Figure 3:
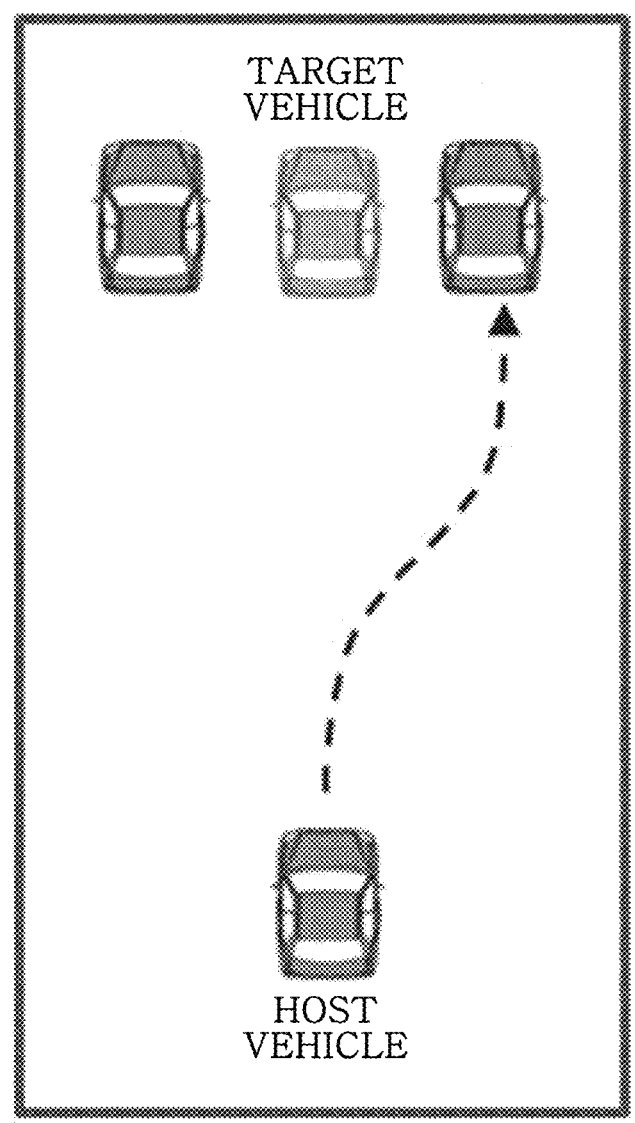
FIG. 3 is a conceptual diagram illustrating an exemplary case in which not only a leading vehicle is present in a longitudinal direction of a forward region of a host vehicle but also other leading vehicles are present in a latitudinal direction of the forward region.

Referring to FIG. 2, the ECU 30 may receive detection signals from the front lateral detection sensors 10 and the vehicle dynamics sensor 20, and may recognize whether there is a high possibility of collision between the host vehicle and any leading vehicle present in a forward region of the host vehicle (S210). If the ECU 30 determines the high possibility of collision between the host vehicle and the leading vehicles (S210), the ECU 30 may select a target vehicle for AEB-control by recognizing the possibility of collision between the host vehicle and each leading vehicle (S220). In this case, a parameter indicating the possibility of collision between the host vehicle and each leading vehicle may be a time-to-collision (TTC) parameter, etc. The TTC parameter may be acquired by dividing a distance between two objects (i.e., the host vehicle and each leading vehicle) by a relative speed.

Thereafter, the ECU 30 may allow the front lateral detection sensor 10 to detect not only the presence or absence of a target vehicle that is present in a forward region of the host vehicle while simultaneously traveling in the same lane as the host vehicle, but also the presence or absence of at least one moving object present in front lateral directions of a left lane and a right lane relative to the current lane of the host vehicle (S230). Alternatively, the ECU 30 may allow the front lateral detection sensor 10 to detect not only the presence or absence of a target vehicle that is present in a forward region of the host vehicle while simultaneously traveling in the same lane as the host vehicle, but also the presence or absence of any external object (e.g., precast pavers, guardrails, curbs, etc.) present in front lateral directions of a left lane and a right lane relative to the current lane of the host vehicle (S235).

If the moving object or the external object is not detected in front lateral directions of the left and right lanes of the current lane of the host vehicle (NO in S230 and S235), the ECU 30 may perform AEB control while simultaneously maintaining a legacy AEB control available speed (e.g., 60 km/h) (S245). If the moving object or the external object is detected in front lateral directions of the left and right lanes of the current lane of the host vehicle (YES in S230 and S235), the ECU 30 may determine the presence or absence of a steering avoidable region in left/right lateral directions of the target vehicle to be AEB-controlled (selected in step S220), and may determine the presence or absence of a possibility of steering avoidance control of the host vehicle (S240).

Figure 4:
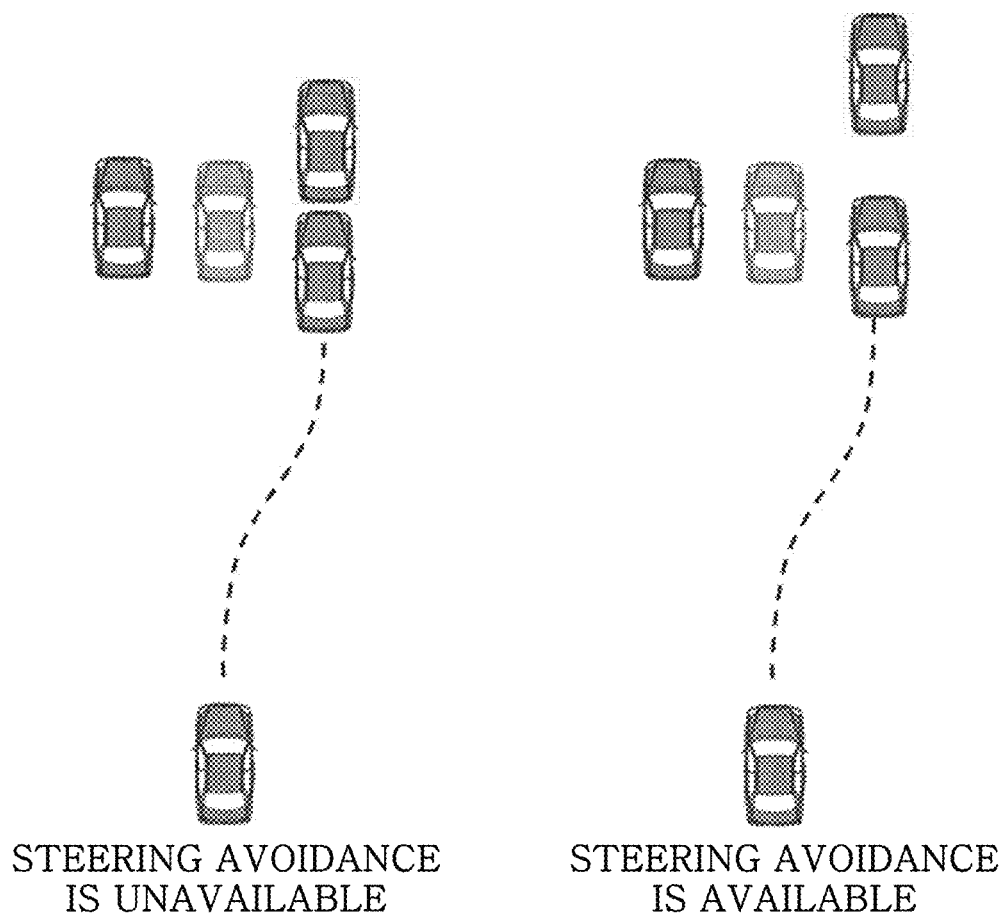
FIG. 4 is a conceptual diagram illustrating information about whether the host vehicle can perform steering avoidance when not only a leading vehicle is present in a longitudinal direction of a forward region of a host vehicle but also other leading vehicles are present in a latitudinal direction of the forward region.

If the presence of the possibility of steering avoidance control is decided (S240) (for example, if a moving object or an external object is present in front lateral directions of left and right lanes of a lane in which the target vehicle is traveling as shown in FIG. 4 (YES in S240)), the ECU may perform AEB control while simultaneously maintaining the legacy AEB control available speed (e.g., 60 km/h) (S245). If there is no possibility of steering avoidance control (S240) (for example, if a moving object or an external object is present in lateral directions of the target vehicle as shown in FIG. 4 (NO in S240)), the ECU 30 may control an AEB control available speed defined as a collision avoidable speed to increase from the legacy AEB control available speed (e.g., 60 km/h) to a higher speed (e.g., 90 km/h) (S250).

Thereafter, if the driver of the host vehicle has an intention to perform vehicle manipulation (e.g., manipulation of a steering wheel, an accelerator, a brake, etc.) (YES in S260), the ECU 30 may return to step S210 to again recognize the presence of the possibility of collision between the host vehicle and the leading vehicles, and may re-perform the above-mentioned steps S220 to S250 based on the recognized result. If the driver of the host vehicle has no intention to perform vehicle manipulation (e.g., manipulation of a steering wheel, an accelerator, a brake, etc.) (NO in S260), the ECU 30 may perform AEB control at the higher AEB control available speed increased in step S250 (S270).

As is apparent from the above description, the system and method for performing autonomous emergency braking based on peripheral situations of a host vehicle according to the embodiments of the present disclosure can determine whether the host vehicle can perform steering avoidance based on the peripheral situations when not only a leading vehicle present in a longitudinal direction of a forward region of the host vehicle but also other leading vehicles present in a latitudinal direction of the forward region are detected, and can reduce a possibility of collision between the host vehicle and the leading vehicles by increasing the size of an AEB control available region and/or an AEB control available speed when the host vehicle is unable to perform steering avoidance.

Although a few exemplary embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An autonomous emergency braking (AEB) system comprising:
   a front sensor configured to detect external objects in longitudinal and lateral directions in a forward region of a host vehicle, and to detect a distance and a relative speed between the host vehicle and each external object or to detect peripheral images of the host vehicle;
   a vehicle dynamics sensor configured to detect a driving speed of the host vehicle; and
   an electronic control unit (ECU) configured to receive detection signals from the front sensor and the vehicle dynamics sensor,
   wherein the ECU is configured to increase an AEB control available speed when the external objects are detected in the longitudinal and lateral directions of the forward region of the host vehicle and the host vehicle is unable to perform steering avoidance capable of preventing collision with the external objects, and
   wherein the AEB control available speed is a maximum predetermined speed limit at or below which an AEB control is performed.

2. The autonomous emergency braking (AEB) system according to claim 1, wherein the ECU determines whether there is a possibility of collision between the host vehicle and one of the external objects, selects the one of the external objects as a target vehicle for the AEB control, and increases the AEB control available speed if the external objects are detected in a current lane of the host vehicle and in left and right lanes relative to the current lane, and if a steering avoidance available region is not present in the left and right lanes.

3. The autonomous emergency braking (AEB) system according to claim 2, wherein if an external object is not detected in either one of the left and right lanes or the steering avoidance available region is present in the left or right lane,
the ECU is configured to maintain the AEB control available speed.

4. The autonomous emergency braking (AEB) system according to claim 2, wherein:
before a driver of the host vehicle manipulates the host vehicle, the ECU determines again whether there is a possibility of collision between the host vehicle and one of the external objects.

5. The autonomous emergency braking (AEB) system according to claim 4, wherein whether there is a possibility of collision between the host vehicle and one of the external objects is determined based on a time-to-collision (TTC) parameter indicating a total time to be consumed until two objects collide with each other.

6. An autonomous emergency braking (AEB) method comprising:
receiving, from at least one sensor, a distance and a relative speed between a host vehicle and an external object, peripheral images of the host vehicle, or a driving speed of the host vehicle; and
performing an AEB control by increasing an AEB control available speed when the external object is present in longitudinal and lateral directions of a forward region of the host vehicle and the host vehicle is unable to perform steering avoidance capable of preventing collision with the external object,
wherein the AEB control available speed is a maximum predetermined speed limit at or below which the AEB control is performed.

7. The autonomous emergency braking (AEB) method according to claim 6, wherein the step of performing the AEB control includes:
determining whether there is a possibility of collision between the host vehicle and the external object;
selecting the external object as a target vehicle; and
increasing the AEB control available speed if the external object is present in a current lane of the host vehicle and other external objects are present in left and right lanes relative to the current lane, and if a steering avoidance available region is not present in the left and right lanes.

8. The autonomous emergency braking (AEB) method according to claim 7, wherein the step of performing the AEB control further includes:
maintaining the AEB control available speed if an external object is not present in either one of the left and right lanes or if the steering avoidance available region is present in the left or right lane.

9. The autonomous emergency braking (AEB) method according to claim 7, further comprising:
before a driver of the host vehicle manipulates the host vehicle, determining again whether there is a possibility of collision between the host vehicle and one of the external objects.

10. The autonomous emergency braking (AEB) method according to claim 9, wherein whether there is a possibility of collision between the host vehicle and one of the external objects is determined based on a time-to-collision (TTC) parameter indicating a total time to be consumed until two objects collide with each other.

11. An autonomous emergency braking (AEB) system comprising:
a sensor configured to detect an external object relative to a host vehicle; and an electronic control unit (ECU) configured to receive a detection signal from the sensor,
wherein an AEB is performed when the host vehicle is moving at a predetermined speed or less,
wherein the ECU is configured to increase or maintain the predetermined speed based on the detection signal, and
wherein the predetermined speed is a maximum predetermined speed limit at or below which the AEB is performed.

12. The autonomous emergency braking (AEB) system according to claim 11, wherein the ECU increases the predetermined speed when the detection signal indicates collision with the external object cannot be avoided via steering control.

13. The autonomous emergency braking (AEB) system according to claim 11, wherein the ECU maintains the predetermined speed when the detection signal indicates collision with the external object can be avoided via steering control.

14. The autonomous emergency braking (AEB) system according to claim 11, wherein the sensor is configured to detect whether the external object is present in longitudinal and lateral directions in a forward region of the host vehicle, and
wherein the ECU increases the predetermined speed when the detection signal indicates the external object is present in the longitudinal and lateral directions of the forward region of the host vehicle and the detection signal indicates collision with the external object cannot be avoided via steering control.

15. An autonomous emergency braking (AEB) method comprising:
detecting, from a sensor, an external object relative to a host vehicle; and
receiving a detection signal from the sensor, wherein an AEB is performed when the host vehicle is moving at a predetermined speed or less; and
increasing or maintaining the predetermined speed based on the detection signal,
wherein the predetermined speed is a maximum predetermined speed limit at or below which the AEB is performed.

16. The autonomous emergency braking (AEB) method according to claim 15, wherein the predetermined speed is increased when the detection signal indicates collision with the external object cannot be avoided via steering control.

17. The autonomous emergency braking (AEB) method according to claim 15, wherein the predetermined speed is maintained when the detection signal indicates collision with the external object can be avoided via steering control.

18. The autonomous emergency braking (AEB) method according to claim 15, wherein the sensor is configured to detect whether the external object is present in longitudinal and lateral directions in a forward region of the host vehicle, and
wherein the predetermined speed is increased when the detection signal indicates the external object is present in the longitudinal and lateral directions of the forward region of the host vehicle and the detection signal indicates collision with the external object cannot be avoided via steering control.

\* \* \* \* \*